(12) United States Patent
Agrawal et al.

(10) Patent No.: US 9,476,428 B2
(45) Date of Patent: Oct. 25, 2016

(54) ULTRA HIGH PRESSURE TURBOMACHINE FOR WASTE HEAT RECOVERY

(75) Inventors: Giridhari L. Agrawal, Simsbury, CT (US); Charles W. Buckley, West Hartford, CT (US); Ali Shakil, West Hartford, CT (US); Andrew Hamilton Coward, Windsor, CT (US)

(73) Assignee: R & D Dynamics Corporation, Bloomfield, CT (US)

( * ) Notice: Subject to any disclaimer, the term of this patent is extended or adjusted under 35 U.S.C. 154(b) by 906 days.

(21) Appl. No.: 13/484,751

(22) Filed: May 31, 2012

(65) Prior Publication Data

US 2012/0306206 A1 Dec. 6, 2012

Related U.S. Application Data

(63) Continuation-in-part of application No. 13/191,979, filed on Jul. 27, 2011.

(60) Provisional application No. 61/492,233, filed on Jun. 1, 2011.

(51) Int. Cl.
*F04D 25/08* (2006.01)
*F04D 29/58* (2006.01)
*F04D 25/02* (2006.01)
(Continued)

(52) U.S. Cl.
CPC ............ *F04D 25/024* (2013.01); *F01D 15/10* (2013.01); *F01D 25/125* (2013.01); *F01D 25/168* (2013.01); *F04D 25/0606* (2013.01); *H02K 1/32* (2013.01)

(58) Field of Classification Search
CPC ........ F01D 15/10; F01D 25/12; F01D 25/14; F01D 25/125; F01D 25/168; F04D 25/024; F04D 25/0606; H02K 1/32; H02K 1/325
See application file for complete search history.

(56) References Cited

U.S. PATENT DOCUMENTS 2,226,986 A   12/1940   Wechsberg et al.
2,694,157 A   11/1954   Cone
(Continued)

FOREIGN PATENT DOCUMENTS

WO    WO2010072496    * 7/2010

OTHER PUBLICATIONS

Giri L. Agrawal, "Foil Air/Gas Bearing Technology—An Overview," Presented at the International Gas Turbine & Aeroengine Congress & Exhibition, Jun. 2-Jun. 5, 1997, pp. 1-11, 97-GT-347.

*Primary Examiner* — Bryan Lettman
(74) *Attorney, Agent, or Firm* — McCormick, Paulding & Huber LLP

(57) ABSTRACT

A turbine-driven alternator (i.e., a turbomachine) suitable for generating electrical power from process gas waste energy. In particular suitable for very high density process gases such as super critical CO2, R134a, R245fa, etc. The turboalternator comprises two separate machines, specifically, a turbine device and an alternator device operatively connected together by a coupling shaft. The rotating shaft assemblies for each machines on the turbine side and the alternator side are supported by hydrodynamic foil gas bearings. The foil gas bearings use process gas at the turbine side, enabling high-pressure operation (~3000 psia) and thrust load balancing. At the alternator side, cooling fluid is used in the foil gas bearings, enabling high-speed (~40,000 rpm), low-windage, oil-free operation with closed-loop shaft cooling.

13 Claims, 10 Drawing Sheets

(51) Int. Cl.
*F01D 15/10* (2006.01)
*F01D 25/12* (2006.01)
*F01D 25/16* (2006.01)
*H02K 1/32* (2006.01)
*F04D 25/06* (2006.01)

(56) References Cited

U.S. PATENT DOCUMENTS

| | | |
|---|---|---|
| 2,735,027 A | 2/1956 | Formhals et al. |
| 2,972,309 A | 2/1961 | Bollibon et al. |
| 2,994,004 A | 7/1961 | Macha et al. |
| 3,022,739 A | 2/1962 | Herrick et al. |
| 3,094,272 A | 6/1963 | McClure |
| 3,105,631 A | 10/1963 | Hanny |
| 3,296,824 A | 1/1967 | Rohrs et al. |
| 3,375,046 A | 3/1968 | Marley |
| 3,382,014 A | 5/1968 | Marley |
| 3,391,291 A | 7/1968 | Benson et al. |
| 3,394,659 A | 7/1968 | Van Alen |
| 3,635,534 A | 1/1972 | Barnett |
| 3,981,628 A | 9/1976 | Carter |
| 4,120,616 A | 10/1978 | Dwyer et al. |
| 4,167,295 A | 9/1979 | Glaser |
| 4,171,928 A | 10/1979 | Emerson |
| 4,209,207 A | 6/1980 | Schippers et al. |
| 4,247,155 A | 1/1981 | Fortmann |
| 4,262,975 A | 4/1981 | Heshmat et al. |
| 4,274,683 A | 6/1981 | Gray et al. |
| 4,277,111 A | 7/1981 | Gray et al. |
| 4,277,112 A | 7/1981 | Heshmat |
| 4,277,113 A | 7/1981 | Heshmat |
| 4,295,689 A | 10/1981 | Licht |
| 4,296,976 A | 10/1981 | Heshmat |
| 4,300,806 A | 11/1981 | Heshmat |
| 4,301,375 A | 11/1981 | Anderson |
| 4,362,020 A | 12/1982 | Meacher et al. |
| 4,402,618 A | 9/1983 | Fortmann et al. |
| 4,415,280 A | 11/1983 | Agrawal |
| 4,415,281 A | 11/1983 | Agrawal |
| 4,523,896 A | 6/1985 | Lhenry et al. |
| 4,552,466 A | 11/1985 | Warren |
| 4,557,664 A | 12/1985 | Tuttle et al. |
| 4,558,228 A | 12/1985 | Larjola |
| 4,614,482 A | 9/1986 | Gaffal |
| 4,668,106 A | 5/1987 | Gu |
| 4,699,523 A | 10/1987 | Hagemeister |
| 4,713,739 A | 12/1987 | Ryder et al. |
| 4,865,517 A | 9/1989 | Beehler |
| 5,045,711 A | 9/1991 | Swearingen |
| 5,083,040 A | 1/1992 | Whitford et al. |
| 5,110,220 A | 5/1992 | Gu |
| 5,248,205 A | 9/1993 | Gu et al. |
| 5,310,311 A | 5/1994 | Andres et al. |
| 5,318,366 A | 6/1994 | Nadjafi |
| 5,375,651 A | 12/1994 | Colwell |
| 5,497,615 A | 3/1996 | Noe et al. |
| 5,498,083 A | 3/1996 | Brown |
| 5,547,286 A | 8/1996 | Struziak |
| 5,584,582 A | 12/1996 | Brown |
| 5,634,723 A | 6/1997 | Agrawal |
| 5,642,008 A | 6/1997 | McCracken |
| 5,727,378 A * | 3/1998 | Seymour .................. 60/804 |
| 5,789,824 A | 8/1998 | Selfors et al. |
| 5,794,300 A | 8/1998 | McCracken et al. |
| 5,831,341 A | 11/1998 | Selfors et al. |
| 5,833,369 A | 11/1998 | Heshmat |
| 5,845,509 A | 12/1998 | Shaw et al. |
| 5,857,348 A | 1/1999 | Conry |
| 5,893,423 A | 4/1999 | Selfors et al. |
| 5,961,217 A | 10/1999 | Heshmat |
| 5,988,885 A | 11/1999 | Heshmat |
| 6,046,509 A | 4/2000 | LaBaire |
| 6,050,727 A | 4/2000 | Messmer et al. |
| 6,102,672 A | 8/2000 | Woollenweber et al. |
| 6,155,802 A | 12/2000 | Choi et al. |
| 6,158,893 A | 12/2000 | Heshmat |
| 6,302,661 B1 | 10/2001 | Khanwilkar et al. |
| 6,307,278 B1 | 10/2001 | Nims et al. |
| 6,353,273 B1 | 3/2002 | Heshmat et al. |
| 6,375,438 B1 | 4/2002 | Seo |
| 6,450,781 B1 | 9/2002 | Petrovich et al. |
| 6,471,493 B2 | 10/2002 | Choi et al. |
| 6,488,467 B2 | 12/2002 | Czechowski et al. |
| 6,498,410 B1 | 12/2002 | Yashiro et al. |
| 6,499,955 B2 | 12/2002 | Choi et al. |
| 6,505,837 B1 | 1/2003 | Heshmat |
| 6,523,366 B1 | 2/2003 | Bonaquist et al. |
| 6,579,078 B2 | 6/2003 | Hill et al. |
| 6,608,418 B2 | 8/2003 | Andres et al. |
| 6,634,853 B1 | 10/2003 | Anderson |
| RE38,373 E | 12/2003 | Bosley |
| 6,698,929 B2 | 3/2004 | Choi et al. |
| 6,702,463 B1 | 3/2004 | Brockett et al. |
| 6,752,533 B2 | 6/2004 | Saville et al. |
| 6,770,993 B1 | 8/2004 | Heshmat et al. |
| 6,830,842 B2 | 12/2004 | Siepierski et al. |
| 6,881,027 B2 | 4/2005 | Klaass et al. |
| 6,948,853 B2 | 9/2005 | Agrawal |
| 6,951,241 B1 | 10/2005 | Gatley |
| 6,965,181 B1 | 11/2005 | Heshmat et al. |
| 6,997,686 B2 | 2/2006 | Agrawal et al. |
| 7,021,905 B2 | 4/2006 | Torrey et al. |
| 7,063,519 B2 | 6/2006 | Agrawal et al. |
| 7,070,330 B2 | 7/2006 | Agrawal |
| 7,112,036 B2 * | 9/2006 | Lubell et al. .................. 415/104 |
| 7,261,300 B2 | 8/2007 | Agrawal et al. |
| 7,574,867 B2 | 8/2009 | Teets et al. |
| 7,591,632 B2 | 9/2009 | Baecke et al. |
| 7,614,853 B2 | 11/2009 | Saville |
| 7,624,592 B2 | 12/2009 | Lui et al. |
| 7,638,892 B2 * | 12/2009 | Myers ...................... F01D 1/22 290/52 |
| 7,728,475 B2 | 6/2010 | Himmelmann |
| 7,784,279 B2 | 8/2010 | Shindo |
| 7,948,105 B2 | 5/2011 | Agrawal et al. |
| 8,029,194 B2 | 10/2011 | Agrawal et al. |
| 8,215,928 B2 | 7/2012 | Agrawal et al. |
| 8,686,607 B2 * | 4/2014 | Elender .................... H02K 9/18 310/52 |
| 2003/0038553 A1 | 2/2003 | Andres et al. |
| 2004/0066991 A1 | 4/2004 | Agrawal |
| 2004/0161333 A1 | 8/2004 | Klaass et al. |
| 2004/0189126 A1 | 9/2004 | Brunet et al. |
| 2005/0047690 A1 * | 3/2005 | Keramati et al. ............. 384/368 |
| 2005/0126182 A1 | 6/2005 | Teets et al. |
| 2007/0196215 A1 * | 8/2007 | Frosini et al. ................. 417/120 |
| 2007/0266695 A1 | 11/2007 | Lui et al. |
| 2008/0197634 A1 | 8/2008 | Himmelmann |
| 2008/0232962 A1 | 9/2008 | Agrawal et al. |
| 2009/0028730 A1 | 1/2009 | Radermacher et al. |
| 2010/0201127 A1 | 8/2010 | Himmelmann |

* cited by examiner

ULTRA HIGH PRESSURE TURBOMACHINE FOR WASTE HEAT RECOVERY

CROSS-REFERENCE TO RELATED APPLICATIONS

This application claims the benefit under 35 USC §119(e) of U.S. Provisional Application No. 61/492,233, filed Jun. 1, 2011, and under 35 USC §119(a) of U.S. application Ser. No. 13/191,979, filed Jul. 27, 2011. Those priority applications are incorporated herein by reference.

FIELD OF THE INVENTION

The present invention relates generally to turbomachinery, and more particularly to turbine-driven alternators used to convert energy stored in a process gas into electrical energy.

BACKGROUND OF THE INVENTION

Turbine-driven alternators, namely turboalternators, are a key piece of machinery in many different systems for generation of energy. In a turboalternator, a turbine converts stored energy in a process gas to mechanical energy. An alternator, which is typically coupled to the turbine via a coupling shaft, converts the mechanical energy into electrical energy. The electrical energy is then supplied to a load. Such a turboalternator thus provides a means for converting energy stored in a process gas into electrical energy that is readily available to the user. These devices are especially useful for self-generation of electric energy and local power, and have long been employed in circumstances where power is not readily available from traditional sources, such as in remote locations. For example, turboalternators may be used in various applications, such as industrial waste heat recovery: in refineries, petrochemical; heavy industries such as pulp and paper, glass, steel, aluminum; residential and automotive industries: residential and tri-generation, solar, hybrid engines, internal combustion engines; and distributed energy industries: retail, residential commercial developments using Brayton Cycle, Organic Rankine Cycles (ORC).

U.S. Pat. No. 5,045,711 describes a prior art turboexpander-generator device typical of devices used on offshore oil/gas platforms where a source of pressurized gas is available and used to generate electricity. This device utilizes a turboexpander, an electric generator, and a lubrication pump, all fixed to a common rotating shaft. The lubrication pump provides oil to bearings supporting the rotating shaft, and further controls an actuator associated with variable inlet nozzles of the turboexpander. Unfortunately, oil-lubricated bearings as used in the device of U.S. Pat. No. 5,045,711 are unreliable, especially at the high running speeds more typical of and expected from modern turbomachinery devices. Further, shaft seals tend to wear out quickly and oil contamination of the process gas becomes a significant problem.

Similar turboalternator devices have attempted to address the deficiencies of oil-lubricated bearings. For example, U.S. Pat. Nos. 4,362,020 and 4,558,228 replace oil-lubricated bearings with hydrodynamic tilting pad bearings in energy conversion turboalternator systems. Unfortunately, titling pad bearings still suffer from high power loss, mechanical complexity, pivot fretting, limited damping capacity and indirect measurement of bearing loading.

An additional common concern with turboalternator devices is the creation of a high thermal signature. Thus, an important aspect of the design of such machinery is the creation of a temperature drop across the turbine. In turn, such a temperature drop allows the device to run more efficiently. In many conventional systems, an orifice plate is used to create a temperature drop isenthalpic expansion (i.e., the Joule-Thomson effect). By replacing the orifice with a turbine, a much higher temperature drop can be achieved and thus more efficient operation. This occurs because high-pressure gas is expanded to produce work for driving the alternator, an isentropic process where the resultant low-pressure exhaust gas can achieve desirable very low temperature levels.

To achieve high efficiency in such machinery, the turbine must run at high rotational speeds. As rotational speed increases, the overall machine size can be made smaller without compromising the alternator's output power. Heretofore, known problems with turboalternator devices arose due to the excessive size and complexity of such devices. Requirements for running at high speed include properly designed rotating and non-rotating assemblies and bearings to support a high-speed rotating shaft, which, as noted above, permits smaller devices to be used without affecting operative efficiency and power.

In view of the foregoing, there is a need for a turboalternator design that can operate efficiently at high pressures, high speeds and high temperatures without suffering from the drawbacks common to prior art alternator designs that tend to affect performance, operation, lifespan and efficiency. Accordingly, it is a general object of the present invention to provide a turbine-driven alternator that overcomes the problems and drawbacks associated with the use of such machines at high pressures, on the order of up to about 3000 psia.

SUMMARY OF THE INVENTION

The present invention is generally directed to a turbomachine, and embodiments are especially adapted to motor-driven designs, comprising a high-pressure blower or compressor and a low-pressure motor, or to turbine-driven designs, comprising a high-pressure turbine and a low-pressure alternator or generator. The invention is described below with reference to a turbine-driven alternator, or turboalternator. However, principles and principal features of the invention equally are applicable to turbogenerators, as well as compressors and blowers, and similar turbine-driven and motor-driven turbomachines.

The turboalternator of the present invention generally comprises two separate machines, specifically, a turbine device and an alternator device operatively connected together by a coupling shaft capable of transmitting torque and rotating a high speeds.

In accordance with one embodiment of the present invention, a turbomachine is provided for extracting energy from a process gas, preferably a high-pressure process gas, and more preferably an ultra-high pressure process gas. The inventive turbomachine includes an impeller rotatably housed in a turbine housing for processing process gas flowing between an inlet and an outlet of the turbine housing; an electric machine housed in a machine housing; and an adapter housing connected between the turbine housing and the machine housing. A coupling, housed in the adapter housing, joins a rotating shaft of the turbine impeller to a rotor assembly mounted for rotation in machine housing.

The turbomachine can further include a cooling and thrust balancing system configured to use the process gas for supplying gas flow to at least one hydrodynamic foil gas bearing assembly contained within the turbomachine. The cooling and thrust balancing system includes a supply manifold for distributing process gas to at least one injection port in the turbine housing, and a plurality of seals configured to maintain pre-determined leakage from the turbine housing into the adaptor housing for maintaining a pressure difference between the turbine housing and the adapter housing, said pressure in the turbine housing being higher than the pressure in the adapter housing. The cooling and thrust balancing system further includes a cooling fan mounted in the machine housing and having an inlet operatively connected to the adapter housing so as to draw process gas from the adapter housing for maintaining a pressure difference between the machine housing and the adapter housing, said pressure in the machine housing being higher than the pressure in the adapter housing but lower than the pressure in the turbine housing.

In a first aspect of the present invention, the turbomachine includes a turbine assembly, which includes a turbine housing, a rotating shaft mounted for rotation within the turbine housing, and an impeller rigidly attached to the rotating shaft for rotation therewith. The turbine housing has an inlet for receiving a process gas and has an outlet for discharging the process gas at a reduced pressure. The turbomachine also includes a cooling and thrust balancing system, which includes a supply manifold connected from the inlet of the turbine housing to at least one gas injection port within the turbine housing, and an exhaust manifold connected to the outlet of the turbine housing via at least one vent port within the turbine housing.

In preferred embodiments, the turbine side of the turbomachine comprises a centrifugal-type shrouded impeller with straight-through labyrinth seals on the front and the rear, a turbine collector with an inlet and an outlet for the process gas, a turbine nozzle, turbine bearing housings, and a turbine shaft supported on hydrodynamic journal bearings and thrust foil gas bearings. Further, the turbine housing includes a bell housing encasing the coupling shaft and two-stage labyrinth seals to prevent process gas leakage into an alternator side of the turbomachine.

In a preferred embodiment of the present invention, the thrust bearing assembly includes a thrust runner operatively connected to the rotating shaft of the turbine for rotation therewith. The thrust runner includes a plurality of axial throughholes extending therethrough for thrust balancing.

In another aspect of the present invention, the turbomachine includes an alternator side, preferably designed for operation at a pressure lower than in the turbine side of the turbomachine. The alternator side of the turbomachine includes an alternator housing; a stator assembly mounted in the alternator housing; and a rotor assembly rotatably housed in the alternator housing. The rotor assembly includes a hub having axial grooves along its outer surface; a conductive sleeve covering the axial grooves; at least one permanent magnet mounted over the conductive sleeve; and an outer sleeve mounting the at least one permanent magnet to the conductive sleeve. The alternator also includes a cooling fan rotatably housed in the alternator housing and rigidly connected with the rotor assembly for coaxial rotation therewith. The cooling fan is preferably configured to drive gas flow through the axial grooves of the rotor hub for cooling the rotor assembly and for maintaining a desired pressure level within the alternator housing.

In preferred embodiments, the rotor is a permanent magnet (PM) rotor assembly which comprises a round shaft with a highly conductive metal sleeve that acts to shield eddy currents and to aid heat transfer. Permanent magnets are attached to the shaft and are retained by an outer sleeve. The rotor assembly is supported within the alternator housing by hydrodynamic journal bearings and thrust foil gas bearings.

Further, the alternator stator is preferably made of laminated sheets of thin electrical steel with copper windings in stator slots. The thin steel minimizes losses in the iron of the stator. The stator is cooled by liquid through a jacket around the alternator housing.

In another aspect of the present invention, a low-pressure adapter housing is connected between static portions of the turbine and of the alternator. Respective rotating portions of the turbine and the alternator are connected by a coupling shaft extending through the adapter housing. This coupling shaft transmits torque from the turbine to the alternator during power take out from the alternator leads. The coupling shaft preferably comprises an adapter end which slides onto the turbine shaft and a splined end that slides into the female coupler end of the alternator shaft. The coupling shaft has stages of labyrinth seals to prevent process gas leakage into the atmosphere. In order to minimize alternator shaft windage due to high pressure and the speed, the alternator side is isolated from the turbine via the coupling shaft. Windage on the alternator shaft is due to shearing of the highly viscous fluid in the stator-rotor cavity gap. Therefore, the turbine side preferably runs with a high-pressure process gas whereas alternator side runs with an ambient air.

In accordance with the present invention, cooling flow of the turbine side comprises pressure ports on the periphery of the inner housing of the turbine side to provide high-pressure gas injection for thrust bearing cooling. A bleed out port for cooling gas connection on the turbine inner housing permits gas to be recirculated back to the turbine exhaust.

Further, thrust balancing of the turbine, especially under very high pressures, is achieved by recirculating flow from turbine front to the turbine exhaust via the bleed out ports and the cooling tube. Further thrust load balancing is achieved by providing an ejector port on the bell housing to balance pressures across the turbine. The ejector port outlet may be recirculated back to the turbine exhaust.

In further accordance with the present invention, the alternator side makes use of a unique self-sustained internal cooling flow circuit. The cooling fan is preferably a centrifugal-type impeller with a collector for air inlet and outlet. The impeller is directly coupled to the alternator rotor assembly and shaft. Compressed air from the cooling fan impeller provides cooling for the journal and thrust bearings in the alternator side. The same cooling flow is used to dissipate heat in the alternator housing due to windage between the rotor and the stator. Specifically, cooling channels allow airflow below the magnets. Liquid cooling is also used to dissipate heat from the stator. As a result, the alternator design of the present invention does not require any external cooling source to keep the machine cool.

These and other features of the present invention are described with reference to the drawings of exemplary embodiments of a bearing-supported, high-temperature, high-pressure, high-speed oil-free turboalternator. The exemplary embodiments shown in the drawings are intended to illustrate, but not limit, the invention.

DETAILED DESCRIPTION OF THE INVENTION AND PREFERRED EMBODIMENTS THEREOF

Figure 1:
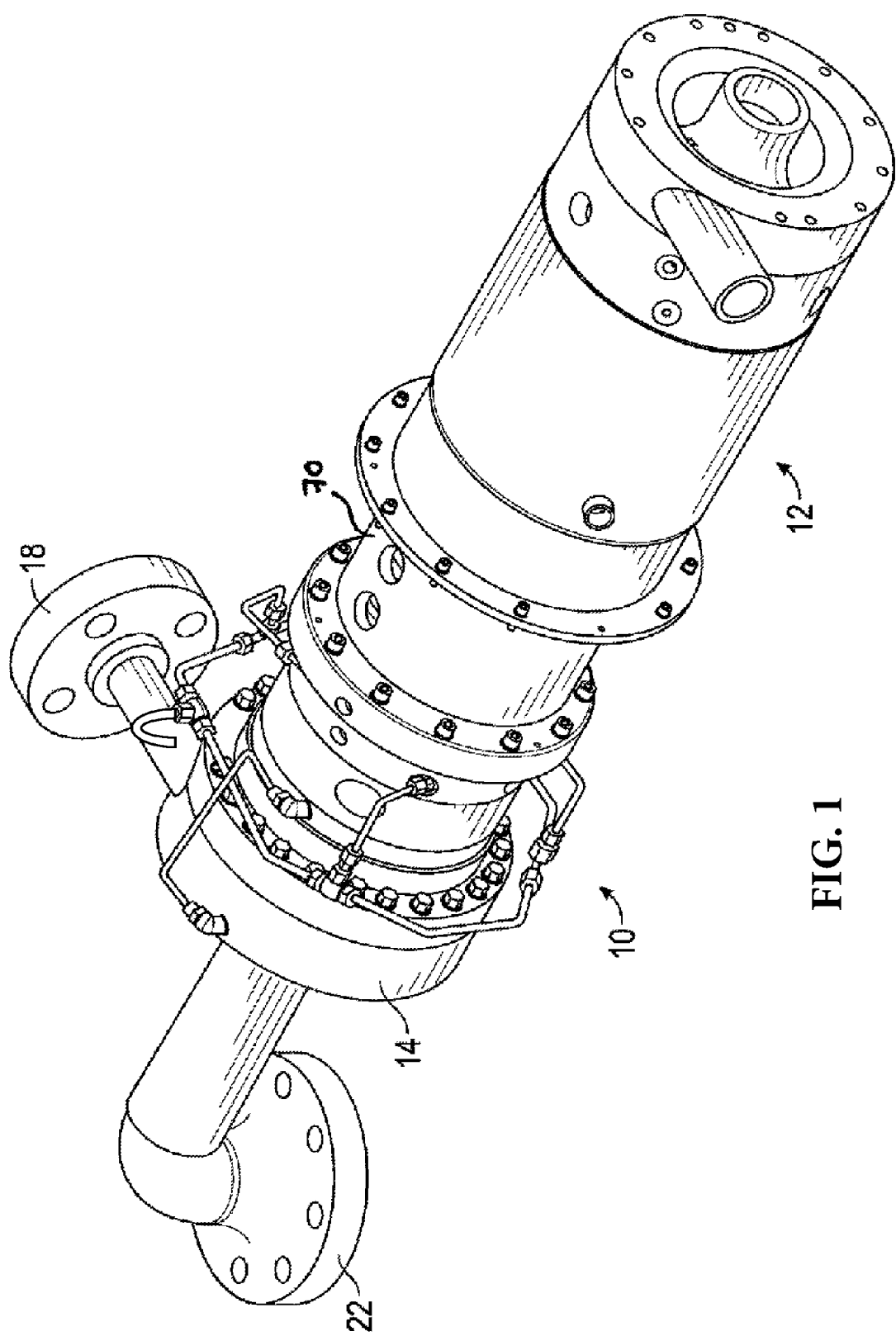
FIG. 1 shows a perspective view of a turboalternator in accordance with an a preferred embodiment of the present invention.
Figure 2:
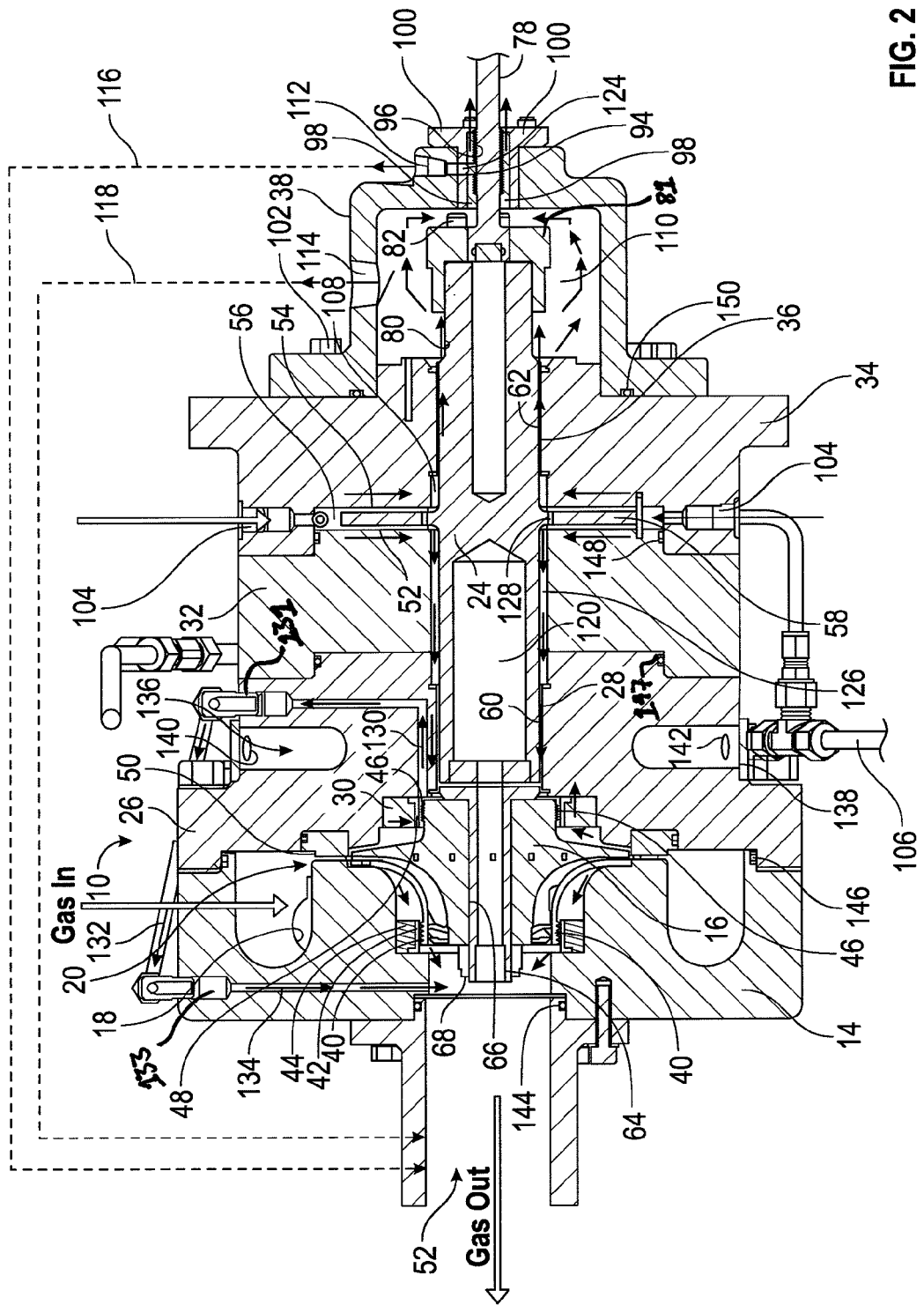
FIG. 2 shows a cross-sectional view of a turbine side of the turboalternator shown in FIG. 1.

The present invention is directed to a power generating system for recovering energy stored in a process gas. A perspective view and cross-sectional view of an exemplary turbine-driven alternator in accordance with the present invention are illustrated in FIGS. 1 and 2, respectively. The illustrated turbine-driven alternator (hereinafter "turboalternator") is preferably a small, high efficiency, oil-free device that can be used in various applications, such as for compressed air energy storage, waste gas energy recovery, pressure letdown, gas liquefaction, and low temperature Organic Rankine Cycles.

The Organic Rankine Cycle's principle is based on a turboalternator working as a steam turbine to transform thermal energy into mechanical energy and finally into electric energy through an electric generator. Instead of water steam, the ORC system vaporizes an organic fluid, characterized by a molecular mass higher than water, which leads to a rotation of the turbine and produces useful power.

The selection of a working fluid is of key importance in low temperature (process occurring near or below the boiling point of water) Organic Rankine Cycles. Because of the low temperature, heat transfer inefficiencies are significant. These inefficiencies depend very strongly on the thermodynamic characteristics of the fluid and on the operating conditions. In order to recover heat at low temperature, the fluid generally has a lower boiling temperature than water. Refrigerants and hydrocarbons are two commonly used components. In order to reduce the footprint of Organic Rankine Cycle and make it more efficient, a high pressure and dense working fluid is required. A fluid with a high latent heat and density will absorb more energy from the source in the evaporator and thus reduce the required flow rate, the size of the facility, and the pump consumption.

One such fluid is carbon dioxide, which usually behaves as a gas in air at atmospheric conditions. If the temperature and pressure are both raised to be at or above the critical point for carbon dioxide, it can adopt properties midway between a gas and a liquid. It behaves as a supercritical fluid above its critical temperature (88° F.) and critical pressure (1072 psia), expanding to fill its container like a gas but with a density like that of a liquid. Raising the pressure to about 3000 psia not only increases the density but also increases the Organic Rankine Cycle efficiency reaching 45%. This could increase the electrical power produced per unit of fuel required by 40 percent or more.

There is no turboalternator, known to exist in the commercial market today, which uses highly dense gas as a working fluid such as super critical CO2 at intense inlet pressure ~3000 psia yet spinning at high speed and providing high efficiency. The present turboalternator invention makes it possible to use super critical CO2 as a working fluid at very high pressures. Embodiments of the invention use foil gas bearings to further enhance the reliability of the machine.

A turboalternator, as shown in FIG. 1, generally comprises a turbine 10 and a generating device, such as an alternator 12 or a generator. FIG. 2 shows a cross-sectional view of the turboalternator. In general, the turboalternator of the present invention operates the same regardless of whether the generating device is an alternator or a generator. Hereinafter, the generating device is described with reference to an alternator. However, this description equally applies to a device using a generator as the generating device.

Referring to FIGS. 1 and 2, the turbine 10 includes a turbine collector 14 defining an interior space within which an impeller 16 or rotor is rotatably mounted. A process gas enters the turbine 10 through an inlet 18, is directed through a fixed inlet nozzle 20 onto the blades of the impeller 16, and exits the turbine collector 14 via an outlet pipe 22. In general, high-pressure process gas passes through the turbine 10 between the inlet 18 and the outlet 22 and causes the impeller 16 to rotate about an axis of rotation. The nozzle 20 increases the kinetic energy of the process gas prior to moving through the impeller 16.

Upon rotation of the impeller 16, the turbine 10 converts mechanical energy to work of a rotating shaft 24 disposed within the turbine housing for rotation about a central axis. This work, in turn, is converted to electric power by the alternator 12 of the turboalternator. The electrical energy or power is withdrawn from the alternator 12 through a power connector (not shown) that is provided on the alternator housing, discussed in more detail below. The electrical outlet of the power connector may provide power to any desirable machinery, power storage unit or the like. Generally, the power output is AC power. In the event that a DC output is desired, power can pass through additional power electronics, not shown but generally known to the person of ordinary skill in the art.

Figure 4:
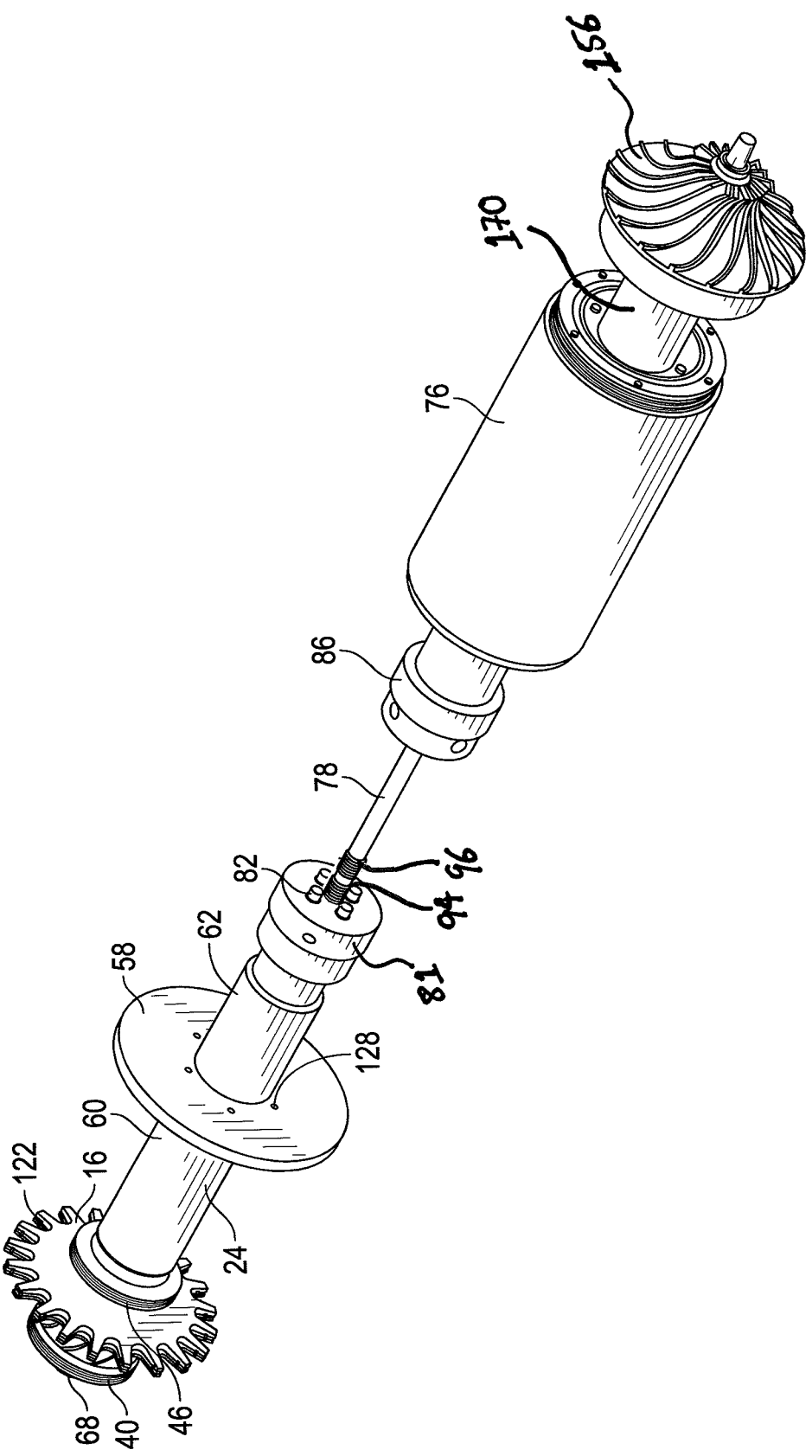
FIG. 4 shows a perspective view of the internal rotating parts of the turboalternator shown in FIG. 1.

The impeller 16 is a centrifugal type shrouded wheel made out of high strength material with excellent corrosion and fatigue resistance. As shown in FIG. 2, the impeller 16 is mounted in the collector 14 near a forward (left) end of the shaft 24. Referring to FIG. 4, the impeller 16 has labyrinth seals 40 and 46 on its front and back faces. More particularly, front labyrinth seal 40 is positioned on the rotating shaft 24 forward of the impeller 16, while rear labyrinth seal 46 is positioned on the shaft 24 rearward from the impeller 16. These labyrinth seals 40 and 46 prevent flow leakage of the process gas within the turbine 10. The front labyrinth seal 40 interacts with a forward stator seal 42, which is held in a seal holder 44 attached to the turbine collector 14. The rear labyrinth seal 46 interacts with a rearward stator seal 48, which is held in the seal holder 30 that is mounted in the turbine housing. Alternatively, labyrinth profiles can be machined on the stator seals 42 and 48 with complementary plain cylindrical faces formed on the rotating shaft 24 on each side of the impeller 16 to provide further stability to the shaft 24 during machine operation at high pressures.

Preferably, the material used for the seals is a high performance polyimide-based material that has low wear, low friction, high strength, high chemical resistance, and excellent performance under extreme temperature conditions, high speeds and high operating pressures.

As noted above, the operational components of the turbine 10 are disposed within a turbine housing. The turbine housing can be a one-piece housing, or, as shown in FIG. 2, a multi-piece housing comprising, for example, the collector 14, a forward housing 26 and a rearward housing 34. The forward and rearward housing 26 and 34 may also be separated by a spacer 32. In accordance with preferred embodiments of the present invention, the turbine housing may further include a bell housing 38.

Referring again to FIG. 2 and specifically proceeding rearward (rightward toward the alternator 12) along the rotating shaft 24, behind the impeller 16 is the turbine forward housing 26, which is attached to the collector 14 to define and hold the nozzle 20. The forward housing 26 also holds a forward hydrodynamic journal bearing assembly 28, and the stator seal holder 30 for the back face of the impeller 16. The spacer 32 is sandwiched between the forward housing 26 and the rearward housing 34. The rearward housing 34 holds a rearward hydrodynamic journal bearing assembly 36. The bell housing 38 is attached to the rearward face of the rearward housing 34. In preferred embodiments of the turbine 10, the turbine collector 14 and housings 26 and 34 are designed using high strength material to withstand 3000 psia of the process gas and hydro tested up to 4500 psia.

An exemplary turbine nozzle 20 for use in the present invention is shown in the turbine cross-sectional view of FIG. 2. Generally, the turbine nozzle 20 comprises a series of vanes arranged radially on an annular plate 50 to control the flow of the process gas to the impeller 16. The nozzle 20 is preferably a convergent design used to increase the kinetic energy of the process gas stream and also to direct the process gas into and through the impeller 16 at an optimum angle. The nozzle 20 may have either fixed geometry or variable geometry.

When the rearward housing 34 is assembled with the forward housing 26, a set of hydrodynamic thrust bearings (both clockwise 52 and counter clockwise 54) are installed into a thrust bearing cavity 56 that is defined in the turbine housing. As shown, the thrust bearing cavity 56 is defined between the spacer 32 and the rearward housing 34. These thrust bearings sandwich a thrust disc or runner 58 that is provided on the turbine shaft 24.

FIG. 4 shows an isometric view of an exemplary turbine rotating assembly for use in the turboalternator of the present invention. As shown, the rotating assembly comprises the impeller 16 mounted at one end of the rotating shaft 24. The thrust runner 58 is rearwardly disposed from the impeller 16 in the middle of the rotating shaft 24 and positioned between a forward journal surface 60 and a rearward journal surface 62. Preferably, the rotating assembly acts as one rigid piece once assembled.

Referring back to FIG. 2, at the forward or left end of the rotating shaft 24 there is a stub end 64 with a diameter smaller than the journal surfaces 60 and 62. This stub end 64 is threaded at the end on its outside diameter. The impeller 16 has on the inside a through bore 66, which slides on to this stub end 64 so that the impeller 16 sits against the front face of the forward shaft journal surface 60. This turbine rotating assembly is pre-loaded and torqued using a nut 68 on the forward shaft end to provide stiffness against thermal and centrifugal loads.

When the rotating assembly is assembled into the turbine collector 14 and housings 26 and 34, the forward journal surface 60 rests in alignment with forward hydrodynamic journal bearing assembly 28 while the rearward journal surface 62 is positioned behind the thrust runner 58, and rests in alignment with the rear hydrodynamic journal bearing assembly 36. Thus, the rotating shaft 24 is mounted and supported for rotation within the turbine 10 about a central longitudinal axis by two hydrodynamic fluid film journal bearing assemblies generally positioned at opposing ends of the rotating shaft 24. The journal bearing assemblies act to bear the radial loads exerted by the rotating assembly, especially at high operating speeds.

The rotating shaft 24 is also supported against axial loads at high operating speeds by the thrust runner 58, which floats between the pair of hydrodynamic foil gas thrust bearings 52 and 54.

In operation of the turboalternator of the present invention, the turbine rotating assembly is preferably driven by rotation of the impeller 16 about its axis of rotation as the process gas passes between the inlet 18 and the outlet 22. Shaft rotation, generally in the range of 15,000 to 40,000 rpm, effects operation of the alternator 12, as discussed in more detail below. Operation at such speeds may generate high temperatures. Accordingly, the foil gas bearings used in the turbine 10 are preferably coated with a high temperature resin-based matrix to withstand temperatures in excess of 1000° F. even though such temperatures are not typical of operation in the lower temperature ORC regime.

Figure 3:
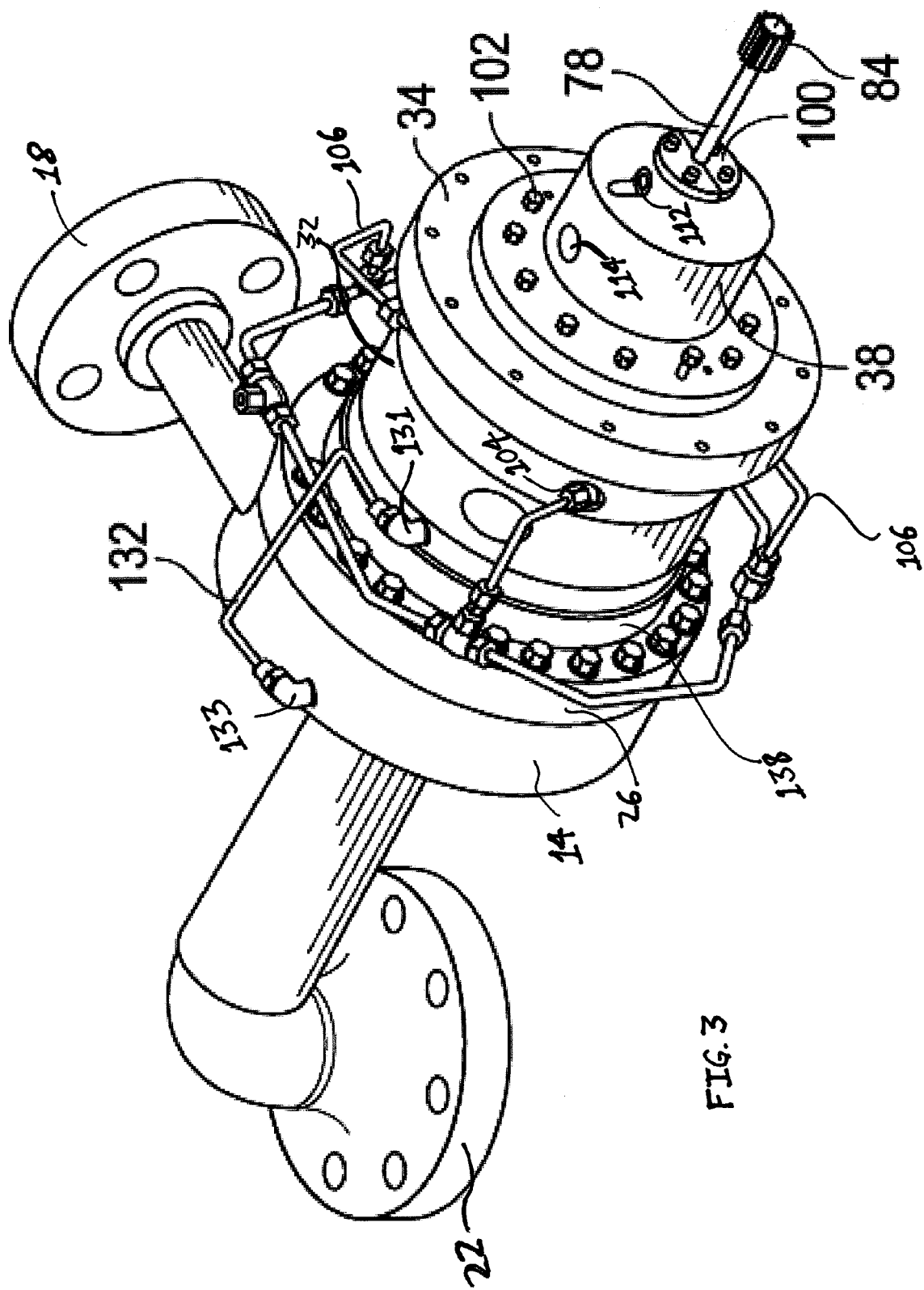
FIG. 3 shows a perspective view of the turbine side of FIG. 2.
Figure 5:
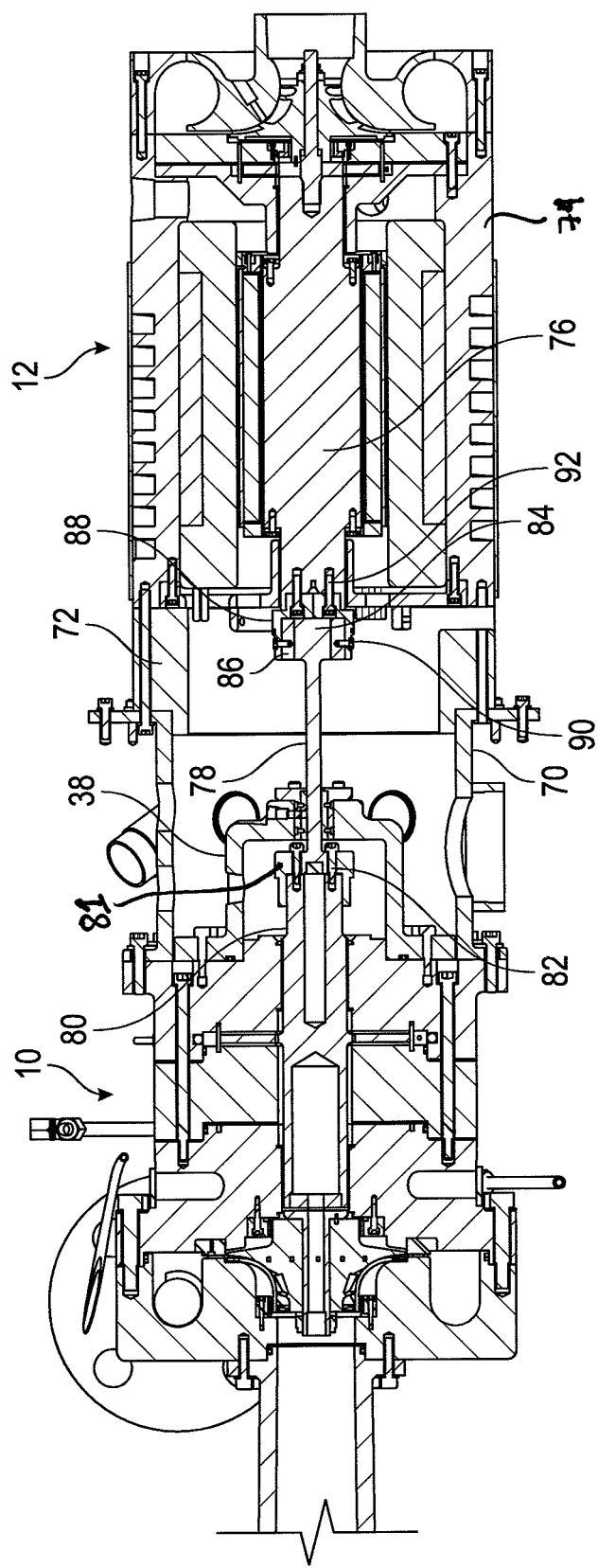
FIG. 5 shows a cross-sectional view of the turboalternator shown in FIG. 1.

Torque is transmitted from the turbine shaft 24 to a rotor assembly 76 of the alternator 12 via a coupling shaft 78. The material of the coupling shaft 78 is chosen to withstand high lateral and torsional loads, while at the same time being compliant enough to accommodate any misalignments between the turbine 10 and the alternator 12. An exemplary design of the coupling between the turbine 10 and the alternator 12 is shown in FIGS. 2-5. For example, a forward or left end of the coupling shaft 78 has a cup-shaped portion 81 that sits on a pilot diameter 80 of the turbine shaft 24 and is fastened thereto using high strength screws 82. The rearward or right end of the coupling shaft 78 has splines 84 that slide axially into a female splined connector 86 on the alternator rotor assembly 76, as shown in FIG. 3. The female connector 86 is held to the alternator rotor assembly 76 by an adapter piece 88 using high strength radial screws 90, as shown in FIG. 5. This adapter piece 88 is then piloted on the alternator rotor assembly 76 and fastened using high strength screws 92. The teeth of the splines 84 are coated with dry film lube to minimize friction between the mating teeth. This prevents thrust load transmission from the turbine 10 to the alternator 12 due to splines locking.

The coupling shaft 78 includes labyrinth seal teeth in two stages 94 and 96 positioned to be receiving within the bell housing 38 attached to the turbine 10. Referring to FIG. 2, the labyrinth seal teeth engage stator seal halves 98, which are held in place by a seal halves holder 100. The seal halves holder 100 is mounted to the outer face of the bell housing 38, as shown in FIG. 3, which is attached to the turbine rearward housing 34 using high strength screws 102. The stator seal halves 98 are made of the same material as the turbine downstream seals 40 and 46, described above.

Figure 9:
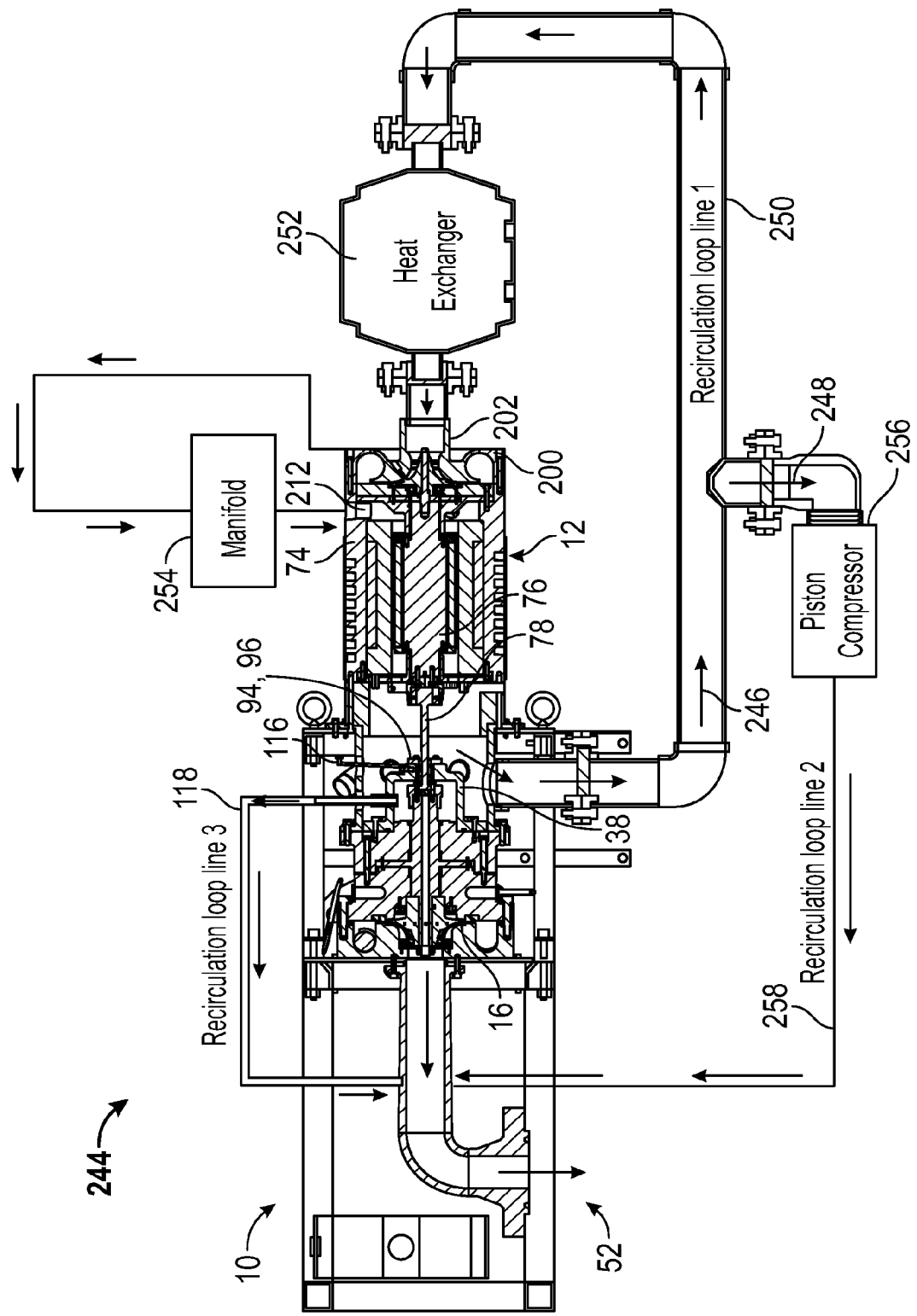
FIG. 9 shows a schematic view of a turboalternator system with recirculating coolant flow, according to an embodiment of the present invention.

In a preferred design, the coupling shaft 78 is encompassed by an adapter housing 70 for added protection. The turbine housings 26, 34 are connected to an alternator housing 74 via the adapter housing 70. Preferably the housing are hermetically sealed together so that the turboalternator can be used in a process gas loop, such as shown in FIG. 9. As further illustrated, a spacer housing 72 is provided as a forward extension of the alternator housing 74. A forward end of the adapter housing 70 is piloted on an outside diameter flange of the rearward turbine housing 34, while a rearward end of the adapter housing 70 is piloted onto the spacer housing 72, thus providing alignment between two machines (e.g., the turbine 10 and the alternator 12) and the concentricity of the respective rotating assemblies.

During operation of a turboalternator in accordance with the present invention, the impeller 16 spins at high speeds around 40,000 rpm. Additionally, the turbine 10 receives process gas at very high inlet pressures, such as about 3000 psia. In operation of the turbine 10, heat is generated within the turbine housing due to journal and thrust bearing windage and the shaft windage. These losses are proportional to the cube of speed, and increase linearly with the pressure. Higher speed and higher pressure means higher losses as the working fluid becomes denser which makes the design of the machine challenging.

Additionally, due to the high pressure of the process gas in preferred applications of the present invention, leakage flows within the turbine 10 combine to produce thrust forces on the turbine impeller 16.

Still further, the high pressures across the impeller 16 and the seals of the coupling shaft 78 induce thrust load either towards or away from the turbine 10. This load needs balancing so that operation of the turboalternator is not detrimentally affected.

In order to address these challenges, a unique cooling and thrust balancing circuit was devised to keep the turbine 10 cool and operable. The circuit is divided into gas injection cooling and liquid cooling, with the gas injection cooling providing the thrust balancing feature.

FIG. 2 shows the structures for gas injection cooling of the turbine 10. This first cooling circuit comprises gas injection ports 104 on the turbine rearward housing 34 where high-pressure process gas is injected into the thrust bearing chamber 56. These ports 104 are placed and oriented such that the flow coming out of the holes and being injected into the turbine housing flows tangentially to the rotating thrust runner 58, thus ensuring bearing integrity. Flow to these ports 104 is provided from the turbine inlet 18, via supply manifold 106, which is divided into a network of branches feeding flow to each port 104. These tubes are coiled around the turbine housings to distribute cooling flow across the turbine 10. From the thrust bearing chamber 56, roughly half of the flow goes towards one side of the thrust runner 58, while the rest of the gas flow goes towards the other side of the thrust runner 58, thereby allocating a cooling flow to each of the thrust bearings 52 and 54.

Referring to FIG. 2, the flow on the right side of the thrust runner 58 flows through the thrust bearing 54, then through shaft housing air gap cavity 108, and finally through rear journal bearing assembly 36, as indicated by the arrows, thus picking up heat generated from windage. This flow is collected in a bell housing chamber 110 from where it leaks through the two stage labyrinth seal 94 and 96 on the coupling shaft 78 (at the right-side of FIG. 2) and into the adapter housing 70.

Additionally, two ports 112 and 114 are provided in the bell housing 38 to relieve pressure in the bell housing chamber 110. The first port 112 is provided at the seals 98 as mentioned earlier, in order to minimize leakage past the labyrinth teeth 94 and 96, as well as provide pressure balance inside the bell housing 38. The second port 114 is provided on the outside diameter of the bell housing 38 to further control pressure in the bell housing chamber 110. Flow from the ports 112 and 114 is recirculated back to the turbine exhaust 22 via return channel tubes 116 and 118, respectively, shown in an exemplary design in FIG. 9. There is also a blind hole 120 through the center of the turbine shaft 24 to further balance out thrust load. The shrouded impeller 16 is scalloped 122 at its peripheral surface as shown in FIG. 4, to further balance axial reaction forces across the impeller 16.

Most of the leakage flow is collected past first stage labyrinth 94 through a bleed hole 124 provided in the two halves seal 98 and through the bell housing 38. The bleed hole flow is taken out through the precisely sized bleed tube 116 and the flow is recirculated back to the exhaust 22 of the turbine 10. A very small amount of the remaining leakage flows through second stage labyrinth 96 and leaks into the adapter housing 70.

Referring again to FIG. 2, the flow on the left side of the thrust runner 58 goes through the thrust bearing 52, along rotating shaft 24, through an air gap 126 formed in the spacer and forward housings 32 and 26, respectively, and then through front journal bearing assembly 28, as indicated by the arrows, thus picking up heat generated from windage. In order to equalize forces across the thrust runner 58, a plurality of small diameter through holes 128 are provided at the base of the thrust runner 58, as shown in FIG. 4. These holes 128 are sized to minimize centrifugal effects on the thrust runner 58, as well as to prevent choking of the holes 128 under any flow circumstances. In operation, these holes 128 equalize the pressure across the thrust runner 58. The desire is to keep the pressures in the bell housing 38, thrust bearing cavity 56 and turbine exhaust 22 very close to each other with the pressure in the turbine thrust bearing cavity 56 being preferably ever so slightly higher so as to force flow toward the front and rear ends of the turbine 10.

A bleed hole 130 is provided in the face of the forward housing 26 behind the back face of the impeller 16 where flow is collected. The hole 130 is sized such that it does not choke under any flow conditions. The hole 130 centerline is parallel to the axis of rotation and then takes a 90° turn inside the forward housing 26. The flow coming from an outlet port 131 on the forward housing 26 is then recirculated back to the turbine exhaust 22 via a return tube 132. The return tube 132 is attached to an inlet port provided in the turbine collector 14, where there is a straight hole 134 leading the flow directly to the turbine exhaust 22. A portion of cooling flow past the back face of the impeller 16 is leaked through the labyrinth seal 46 is also captured by the same bleed hole 130, and is also recirculated back to the turbine exhaust 22, in the manner described above. The leakage downstream of the impeller 16 that passes by the forward labyrinth seal 40 in front, also mixes with the turbine exhaust flow thus completing the cooling circuit. Thus, all of the leakage from the turbine inlet 18 through the turbine 10 is recaptured and recirculated back to the turbine exhaust 22, making the turbine completely sealed.

Still referring to FIG. 2, a second cooling circuit of the turbine side utilizes an annular space 136, preferably machined as a pocket provided in the forward housing 26 with a sleeve 138 welded on to close the air pocket. This sleeve 138 has inlet and outlet ports 140 and 142, respectively. A liquid flows into the inlet 140 where half of the flow goes forward and half rearward within the turbine housing, then collectively exit out from the outlet 142 port. This cooling flow picks up additional heat generated due to windage on front journal bearing assembly 28 and on the rotating shaft 24. Extensive computational fluid dynamics (CFD) analyses were performed to model the cooling flow of the turbine 10. The design was validated using extensive field testing of the machine.

As discussed above, the turbine 10 is preferably hermetically sealed and does not allow any process gas leakage. In particular, referring again to FIG. 2, there is a radial o-ring seal 144 at the turbine exhaust 22 between the turbine collector 14 and the exhaust outlet pipe. There is also a radial o-ring seal 146 between the turbine collector 14 and the forward housing 26. There is likewise a radial o-ring seal 147 between the forward housing 26 and spacer housing 32, an o-ring seal 148 between the spacer housing 32 and the rearward housing 34, and a face seal o-ring 150 between the rearward housing 34 and the bell housing 38. These seals are designed to withstand very high pressures and temperatures.

Thus, the turbine side of the turboalternator comprises a centrifugal-type shrouded impeller with straight through labyrinth seals on the front and the rear, a turbine collector with an inlet and an outlet for the process gas, a turbine nozzle, turbine bearing housings, and a turbine shaft supported on hydrodynamic journal bearings and thrust foil gas bearings. The turbine housing further includes a bell housing encasing the coupling shaft and holding two stage labyrinth seals to prevent process gas leakage into the alternator side.

In order to maintain the alternator shaft at a lower pressure than the turbine shaft, thereby minimizing windage losses, the alternator side of the present invention is isolated from the turbine side via the coupling shaft 78, the adapter housing 70, and the spacer 72. The adapter housing 70 is vented so that any high-pressure process gas leaked from the turbine 10 does not enter the alternator 12. Typically the alternator 12 operates using air, although the alternator 12 can be operated using any low-pressure process gas. Ultra high pressure process gas is typically not used in the alternator 12, so as to minimize windage loss that would occur due to viscous shear of the high pressure fluid in the stator-rotor cavity gap therein.

Figure 6:
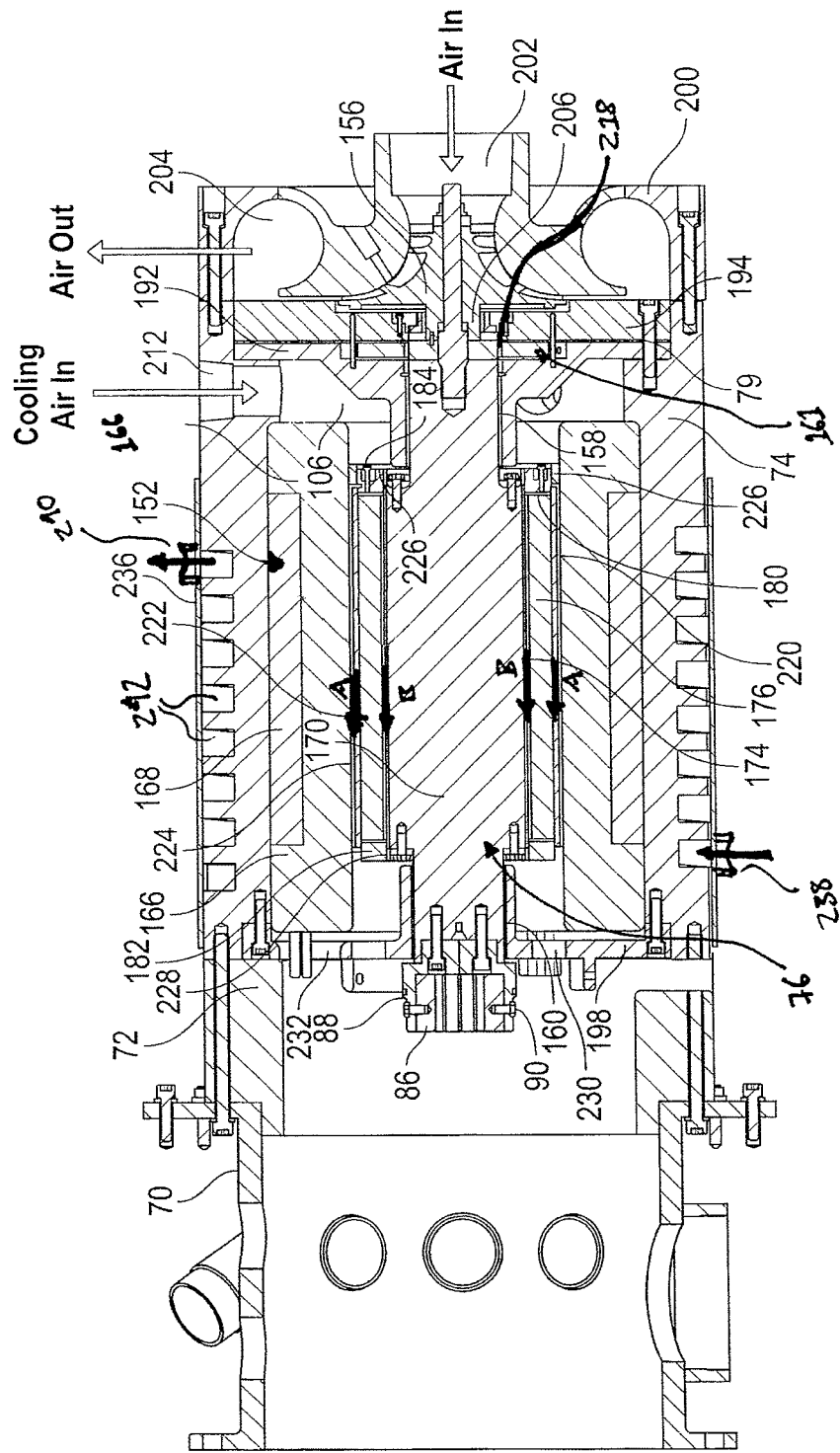
FIG. 6 shows a cross-sectional view of an alternator side of the turboalternator shown in FIG. 1.

As shown in FIG. 6, the alternator 12 includes the alternator housing 74, a stator assembly 152 and a permanent magnet (PM) rotor assembly 76 assembly. The rotor assembly 76 is supported within the stator assembly 152 and the alternator housing 74 on two hydrodynamic journal bearing assemblies 158, 160 and on a foil gas thrust bearing assembly 161. The various bearing assemblies are cooled and supplied with air by a cooling fan 156, which is rigidly attached to one end of the rotor assembly 76.

The alternator stator assembly 152 is press fitted into the inside diameter of the alternator housing 74. The stator assembly 152 comprises windings or end turns 166 and a lamination stack 168. The stator lamination stack 168 includes plural laminated sheets of thin electrical steel forming stator slots that hold copper windings. The thin steel minimizes eddy current losses.

Figure 8:
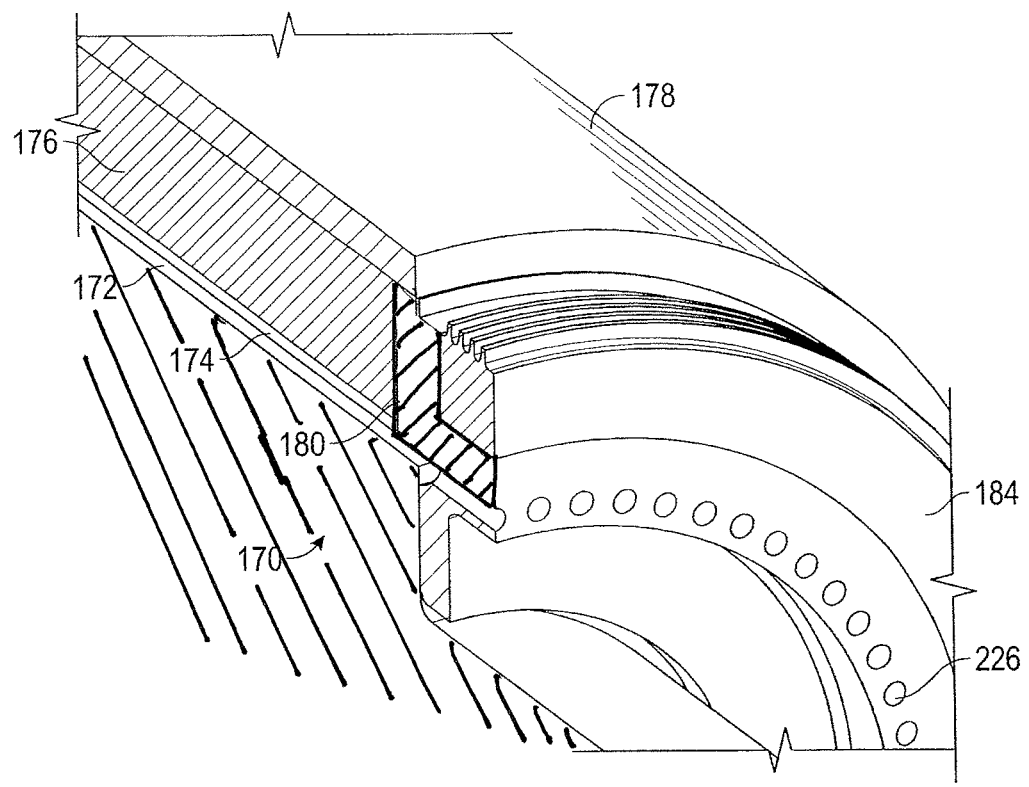
FIG. 8 shows a cross-sectional view of details of the alternator shown in FIG. 6.

Referring to FIG. 8, the rotor assembly 76 is built on a solid alternator shaft or rotor hub 170 that is constructed of a high-strength material. In preferred embodiments, the high strength material is non-conductive or minimally conductive. For cooling purposes, the shaft or rotor hub 170 has a plurality of grooves or channels 172 formed along the outer surface of the shaft 170. These grooves 172 on the shaft 170 are covered with a highly conductive thin metal sleeve 174. Preferably, the sleeve 174 is fitted over the shaft 170 with a light interference fit. At the outer surface of the metal sleeve 174, a rare earth permanent magnet (PM) 176 is segmented and is surface mounted on to the outside diameter of the thin metal sleeve 174. In preferred embodiments of the present invention, the permanent magnets 176 provide four rotor poles. The magnets 176 are retained radially by a high strength outer sleeve 178. For example, pre-molded graphite composite material is an excellent choice for the outer sleeve 178, due to the high surface speed of the rotor. Additionally, graphite composite material provides minimal conduction path for eddy currents induced by air gap flux disturbances.

As shown in FIG. 6, the magnets 176 are captured axially between a front retention ring 180 and a rear retention ring 182. The high strength metal retention rings 180 and 182 are attached at their respective ends of the shaft 170. These rings are also piloted on the shaft diameter using a light interference fit. As shown in FIG. 8, the front retention ring 180 also holds a labyrinth seal rotor ring 184.

Figure 7:
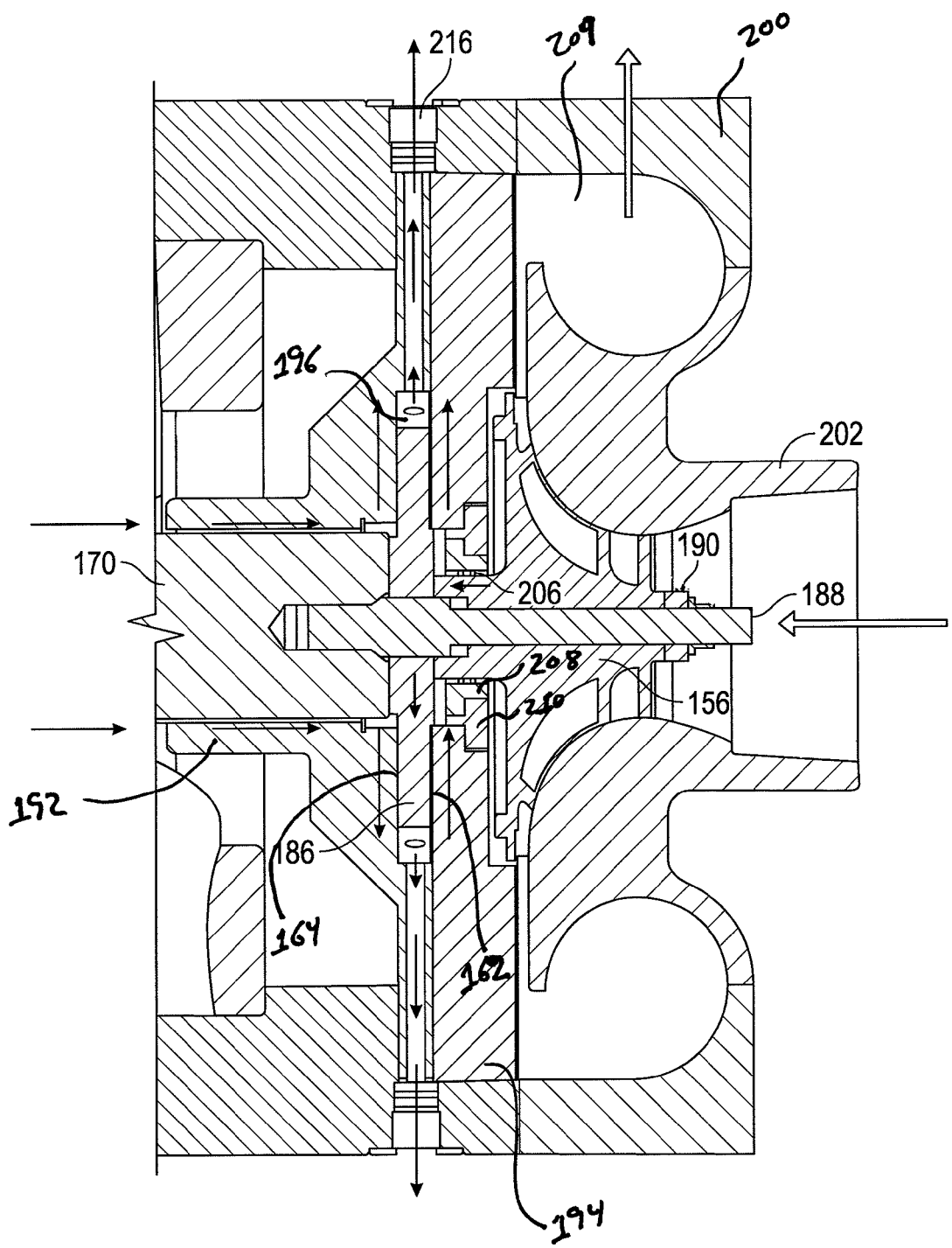
FIG. 7 shows a perspective cutaway view of a rotor shaft of the alternator shown in FIG. 6.

Referring to FIG. 7, the rotor assembly 76 includes a thrust runner or disc 186 that is captured between the alternator shaft 170 and the cooling fan 156 by an axial tie bolt 188. The tie bolt 188 is threaded into the shaft 170 through the bores of the thrust runner 186 and the cooling fan 156, and the cooling fan 156 is held onto the tie bolt 188 using a lock nut 190. This tie bolt 188 is pre-loaded to provide stiffness to the rotor assembly 76. At the other end of the shaft 170 is the coupler adapter 88, which is piloted on the alternator shaft diameter and fastened using high strength screws 92, discussed above. This coupler adapter 88 holds the female splines coupler 86. The female spline coupler 86 slides in axially into the coupler adapter 88 and is fastened radially using high strength bolts 90.

The rotor assembly 76 is supported radially at each end of the shaft 170 using hydrodynamic foil gas journal bearings in first and second journal bearing assemblies 158, 160. A first foil gas journal bearing is held by a first journal bearing sleeve 192, which is supported by a thrust cover plate 194. The first journal bearing sleeve 192 and the thrust cover plate 194 also define the walls of an alternator thrust bearing chamber 196, within which foil gas thrust bearings 162, 164 support the thrust runner 186 that is fastened onto the alternator shaft 170. The second foil gas journal bearing 160 is mounted in a second journal bearing sleeve 198, which is attached directly to the alternator housing 74.

The thrust and journal bearing assemblies are slightly pre-loaded to provide stability during start up. The foil gas bearings are coated with high temperature resin-based matrix coating to provide lubricity during lift off and shut down and also to withstand high temperatures. These are compliant foil gas bearings and provide stiffness and damping against synchronous and non-synchronous response.

Due to the rotor size and operational speed, one aspect of the alternator design is to remove heat generated in the bearings and on the alternator shaft 170 due to windage. Other sources of heat generation in the shaft 170 are losses in the magnets 176 and in the thin metal sleeve 174. The stator part of the alternator 12 has iron and copper losses in the windings 166 and lamination stack 168 which requires separate cooling flow. Thus, eddy currents and windage losses induce heating of the rotor assembly 76 during high-speed operation (about 40,000 rpm). Accordingly, the alternator 12 makes use of two internal cooling flow circuits to address these challenges associated with the losses in the alternator 12. The two circuits provide forced air injection cooling and liquid cooling.

For the forced air injection cooling, FIG. 6 shows an air injection cooling circuit for the alternator 12 that is unique and self-sustaining. It does not require any expensive hardware such as external blowers to blow air through the alternator 12 to keep the machine cool. This cooling flow circuit provides cooling flow for the windage in the shaft 170 and the bearings, and the losses associated with the magnets 176 and the thin metal sleeve 174. The heart of the cooling circuit is the centrifugal-type cooling fan 156. The cooling fan 156 is housed within a fan collector 200 and supplies cooling and lubricating air flow to the foil gas bearings and to the rotor assembly 76. Air enters the fan collector 200 through an inlet 202, flows axially through the fan blade passages, and emerges radially through fan collector outlet 204 at high pressure. The cooling fan 156 is sized using computational fluid dynamics (CFD) analysis based on the system resistance and losses in the alternator 12. The cooling fan 156 is directly coupled with the rotor assembly 76 as noted above, and is preferably a centrifugal-type impeller made out of light material with good corrosion resistance and mechanical properties. In general, air pressure is increased through the fan 156 between the inlet 202 and the outlet 204 to overcome the system resistance and to provide cooling flow for the alternator 12.

In operation of the present invention, rotation of the turbine shaft 24 causes the alternator rotor assembly 76 to spin about an axis of rotation via coupling shaft 78. Thus, the rotation of the turbine impeller 16 essentially drives the cooling fan 156 to provide the cooling flow for the alternator 12. Compressed air from the cooling fan impeller 156 provides cooling and hydrodynamic film lubrication for the journal bearing assemblies 158, 160 and for the thrust bearing assembly 161. The same cooling flow is used to dissipate heat in the alternator housing 74 due to windage losses between the rotor 76 and the stator 152. Specifically, cooling channels 172 allow airflow from the first journal bearing assembly 158, between the rotor magnets 176 and the shaft 170, to the second journal bearing assembly 160.

The outlet 204 of the fan collector 200 takes the high-pressure flow and feeds it back to the alternator housing 74 at three inlet injection ports 212 that are spaced 120° apart (only one port 212 is shown in the cross-section of FIG. 6). The flow from the fan collector outlet 204 to inlet ports 212 can be routed via manifold-tubes configuration which is not shown here. The air from these injection ports 212 enters the alternator housing 74 where it gets distributed towards the right (forward) and the left (rearward).

The air flow from the cooling fan 156 is controlled and divided by an arrangement of several seals in order to balance thrusts across the alternator 12 while also apportioning cooling to the various components. For example, the cooling fan 156 carries the labyrinth seal 206 on the diameter behind its back (leftward) face. The labyrinth seal 206 mates with a stator seal 208, which is housed in a seal holder 210 mounted on the thrust cover plate 194. There is also the rotor seal 184 provided on the alternator shaft 170, which sits on the front axial ring 180. The corresponding part of the stator seal is attached to the inside diameter of the stator 152. The seal material used is a high performance polyimide-based material that has low wear, low friction, high strength, high chemical resistance, and excellent performance under extreme conditions.

Referring to FIG. 6, some of the air goes toward the right side of the alternator 12, flows through the first journal bearing assembly 158, then the counterclockwise thrust bearing 164, as shown by the arrows, thus taking away heat generated by windage. This flow is collected in the thrust bearing cavity chamber 196. There is a labyrinth seal 206 on the back side of the cooling fan 156 which allows some leakage of the air to provide cooling flow for the clockwise thrust bearing 162 on the right-side of the thrust runner 186. This flow is also collected in the thrust bearing chamber 196. The flow streams collected in the thrust bearing cavity chamber 196 are at relatively high temperature as they carry heat away from the bearings. This flow is vented from the alternator 12 using vent holes 216 provided in the alternator housing 74. Also, a plurality of cross-flow holes 218 are provided at the base of the thrust runner 186 to balance out forces generated due to differential pressures, much in the manner described above for the thrust runner 58 of the turbine 10, as shown in FIG. 4. The thrust load due to low pressures is fairly balanced in the machine.

The bulk of the airflow in the alternator 12 goes towards the left side of the machine. This cooling flow is further divided into two flow streams, a first flow stream A and a second flow stream B. The first flow stream A takes away heat generated due to the windage in a mechanical air gap 224, which is a cavity gap between the rotating rotor assembly 76 and the stator 152. The second flow stream B takes away heat generated due to the losses in the magnets 176 and in thin metal sleeve 174. The rotor seal 184 regulates the flow between the mechanical air gap 224 and the shaft grooves 172. The air of the second flow stream B flows through the holes 226 provided in the front retention ring 180 before entering the plurality of grooves or channels 172 formed in the outer surface of the solid shaft 170, as shown in FIG. 8. The purpose of the grooves 172 is to provide greater surface area and flow channels where air stream flows between the channels. As the magnets 176 get hot during machine operation the heat is conducted radially inwards towards the highly conductive thin metal sleeve 174. This metal sleeve 174 gets hot quickly due to its thin cross-section and high conductivity. The second flow stream B under the sleeve 174 in the channels 172 takes up heat generated via forced convection. The hot air comes out of the channels 172 and then through holes 228 provided in the rear retention ring 182. Again there is some pressure drop associated with the sizing of the holes, channel geometry and the surface roughness, but this pressure drop is overcome by the pressure rise in the cooling fan 156.

The first and second flow streams A and B mix together adjacent the second bearing sleeve 198. The majority of the mixed flow exits the alternator housing 74 through vent holes 230 provided in the second journal bearing sleeve 198 and some small amount of the mixed flow exits through second journal bearing assembly 160, thus carrying away heat generated in the rear journal bearing. This hot air finally exits through vent hole provided in the adapter housing 70 that connects the turbine 10 to the alternator 12.

In addition to cooling the shaft 170, the airflow flows over and cools the stator end turns 166 as it enters the alternator housing 74. The flow in the proximity of the end turn 166 at the rear end of the stator 152 comes out through the plurality of vent holes 230 and slots 232 provided in second journal bearing sleeve 198. Extensive computational fluid dynamics (CFD) analyses were performed to model the cooling flow of the alternator 12. The design was validated using extensive field testing of the machine.

For a second cooling circuit, a cooling sleeve jacket 236, and liquid coolant flow inlet and outlet ports 238 and 240, respectively, are welded onto the alternator housing 74. The cooling jacket 236 covers spiral grooves 242 that are machined in the alternator housing 74. Liquid coolant flows through the cooling sleeve jacket 236 to mitigate inductive heating of the stator. The coolant flows from the rear end of the alternator housing 74 spiraling through the spiral grooves 242 exiting out from the front of the housing 74. The cooling jacket 236 is designed for structural integrity, minimizing effects of air gap and the contact resistance. Heat generated in the stator 152 due to iron and copper losses conducts from the stator 152 to the housing walls, where forced flow through the spiral grooves 242 removes the heat thus maintaining operable temperature of the machine. The spiraling grooves 242 are sized to remove heat efficiently with minimum pressure drop.

In order to further improve the thrust load capacity, the present invention can use hydrostatic thrust bearings to support the turbine shaft 24 axially, in place of the hydrodynamic foil gas thrust bearings previously described herein. Since high pressure is available for the thrust bearing cooling, therefore the same cooling flow can be used to provide pressure for the hydrostatic thrust bearings, which are typically stiffer than hydrodynamic bearings and can take loads up to 2000 lbf. This configuration, using hydrostatic thrust bearings, still preferably uses hydrodynamic foil gas journal bearings. If used with hydrostatic thrust bearings, the inlet pressure of the turbine 10 can be raised further from 3000 psia thus enabling even higher power outputs from the alternator 12.

Another variation of the inventive turboalternator of the present invention may use magnetic thrust bearings in combination with hydrodynamic foil gas journal bearings on the turbine side. Use of magnetic thrust bearings increases the thrust load capacity significantly thus enabling the turboalternator scaling for multi mega watt systems.

Another variation of the inventive turboalternator of the present invention, particularly advantageous for thrust balancing as discussed above, is to use pocket damper seals instead of at least some of the labyrinth seals to provide additional damping to the hydrodynamic foil gas bearings when operating at high pressures. The radial partitions provided within the pocket damper seals minimize rotordynamic instability by reducing swirling flows. The seal materials and clearances can be chosen to provide soft rub on the turbine shaft 24 during start up and shut down, thereby further damping instability.

Another variation of the inventive turboalternator of the present invention is to use brush seals, thereby further reducing or at least more tightly controlling shaft leakage.

A novel turboalternator configuration to maintain close to zero leakage is shown in FIG. 9. This configuration provides a Hermetically Sealed Turboalternator 244 where the turbine 10 and the alternator 12 are operated with the same working fluid or gas. The flow leaking past two stage labyrinth seals 94 and 96 downstream of turbine 10 behind the bell housing 38 is pumped out in two flow paths 246 and 248. In flow path 246, some of the flow from the adapter housing 70 is fed to the inlet of the cooling fan 156 using a first recirculation loop line 250. There is a heat exchanger 252 upstream of the fan collector inlet 202 that cools off the temperature of the incoming gas before flowing through the cooling fan 156.

FIG. 9 also shows an intake manifold 254 to distribute cooling flow equally inside the alternator housing 74 using cooling ports 212.

In flow path 248, the rest of the flow leakage is recirculated through a second recirculation loop line 258 and added to the turbine exhaust 22 using a piston compressor 256. The piston compressor 256 is used to raise the pressure of the gas leaking through the two stage labyrinth seals 94 and 96. This pressure rise is slightly higher than the pressure at the turbine exhaust 22 so that flow can be recirculated back to the turbine exhaust 22 while overcoming the pressure drop in the second recirculation loop line 258.

Figure 10:
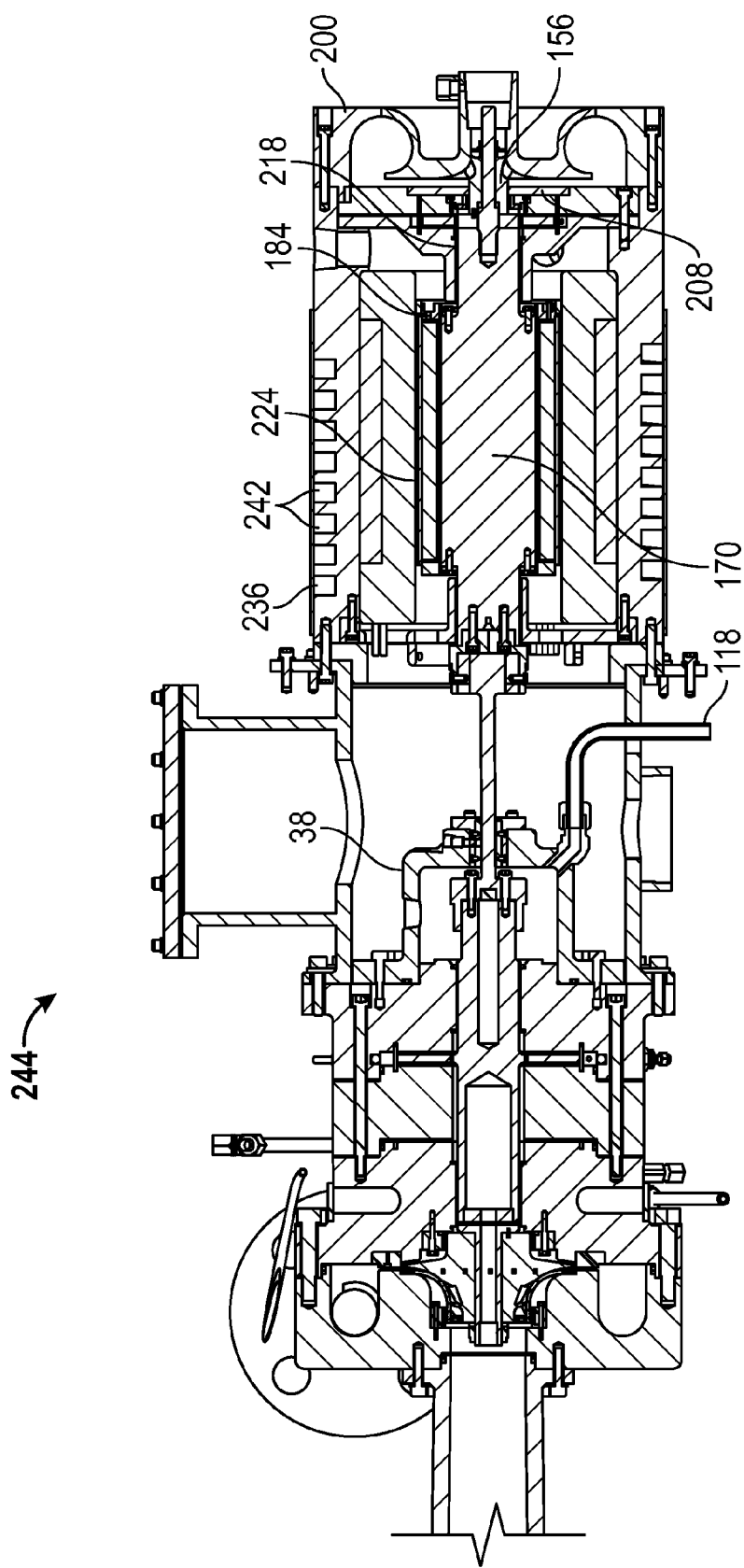
FIG. 10 shows a cross-sectional view of a hermetically sealed turboalternator for use in the system shown in FIG. 9.

FIG. 10 shows the slightly modified geometry of the turboalternator 244 for hermetic sealing. In this modified geometry, the cooling fan 156 provides sufficient cooling flow to the alternator 12 due to increased windage associated with the high-pressure process gas. Shaft seal 208 on the alternator shaft 170 is now used to control the pressure in the shaft cavity (mechanical air gap) 224 to minimize windage.

In various embodiments of the present invention, the turboalternator addresses many of the concerns and drawbacks associated with prior art turboalternators in high-pressure, high-speed and high-temperature operations by using the technology of a coupling shaft and foil gas bearings that allow a sealed, oil-free, contamination free, high-speed, efficient, self cooling system. The invention can be used to provide an ultra-high pressure turboalternator for recovering waste heat in Organic Rankine Cycle (ORC) based systems using very high pressure working fluid such as super critical $CO_2$, comprising an innovative, compact, 40000 rpm & 3000 psia turbine that can be isolated from an alternator without affecting the conversion of energy stored in a process gas into electrical energy. As noted, both the turbine side and the alternator side of the turboalternator illustrated in FIG. 2 preferably include foil gas journal bearings and foil gas thrust bearings. All bearings are oil free. The foil gas journal bearings sit inside journal bearing sleeves that are attached to the machine housing. The foil gas thrust bearings are positioned within the machine housing around a thrust runner. As so positioned, they are pinned and sandwiched between the stacked assembly comprising a journal bearing sleeve and the thrust runner. One thrust bearing is disposed about the thrust runner to operate in clockwise direction relative to the rotating assembly, while the other is disposed as a counterclockwise bearing relative to the rotating assembly.

The foregoing description of embodiments of the invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated. It is intended that the scope of the invention be defined by the claims appended hereto.

What is claimed is:
1. A turbomachine comprising:
a turbine including:
a turbine housing having an inlet for receiving a process gas at a first pressure and having an outlet for discharging the process gas at a second pressure, wherein said second pressure is lower than said first pressure;
a rotating shaft mounted within the turbine housing for rotation about a central longitudinal axis, said rotating shaft being radially supported by at least one journal bearing assembly and axially supported by a thrust bearing assembly mounted within the turbine housing; and
an impeller rigidly attached to the rotating shaft for rotation therewith for processing the process gas from the first pressure to the second pressure, said impeller being housed in a collector portion of the turbine housing and discharging the process gas to the outlet of the turbine housing; and
a cooling and thrust balancing system including:
a gas injection port through the turbine housing into a thrust bearing chamber housing the thrust bearing assembly;
a supply manifold connected from the inlet of the turbine housing to the gas injection port;

a pressure relief vent port through the turbine housing at a location rearward, in a direction away from the impeller, from the thrust bearing chamber;

an exhaust manifold connected to the outlet of the turbine housing via at least the pressure relief vent port;

first and second axial seals on the rotating shaft respectively forward and rearward of the impeller;

third and fourth axial seals on the rotating shaft rearward of the thrust bearing chamber, said third and fourth axial seals being configured to supply a controlled amount of leakage from the turbine housing;

a flow vent port through the turbine housing between the third and fourth axial seals;

a plurality of pressure equalizing holes axially extending through a thrust runner of the thrust bearing assembly operatively connected to the rotating shaft for rotation therewith; and a bleed hole vent port formed in the turbine housing to collect flow from the at least one journal bearing assembly and from the second axial seal.

2. The turbomachine as claimed in claim 1, said gas injection port being oriented to inject the process gas tangentially to the thrust runner.

3. The turbomachine as claimed in claim 1, further comprising:

an alternator having a rotating alternator shaft;

an adapter housing connected between static portions of the turbine and the alternator;

a coupling connecting a rotating turbine shaft of the turbine and the rotating alternator shaft of the alternator through the adapter housing;

said alternator comprising:

an alternator housing;

a stator assembly mounted in said alternator housing;

a rotor assembly rotatably housed in said alternator housing and including:

a hub having axial grooves along its outer surface;

a conductive sleeve covering the axial grooves;

at least one permanent magnet mounted over the conductive sleeve; and an outer sleeve mounting the at least one permanent magnet to the conductive sleeve; and a cooling fan rotatably housed in said alternator housing and rigidly connected with the rotor assembly for coaxial rotation, said cooling fan configured to drive a gas flow through the axial grooves of the hub for cooling said rotor assembly and for maintaining a pressure level within the alternator housing.

4. The turbomachine as claimed in claim 3, wherein the rotor assembly includes first and second journal bearing assemblies disposed at opposing ends of the rotor assembly for radially supporting said rotor assembly within the alternator housing, and wherein the cooling fan is configured to drive a gas flow through radial clearances through said journal bearing assemblies.

5. The turbomachine as claimed in claim 3, said thrust runner being associated with thrust bearings for axially supporting the rotor assembly in the alternator housing, and wherein the cooling fan is configured to drive a gas flow through axial clearances around said thrust runner.

6. The turbomachine as claimed in claim 3, wherein the hub of the rotor assembly is made from a non-conductive material.

7. The turbomachine as claimed in claim 3, wherein the rotor assembly includes forward and rearward rings configured to axially retain the at least one permanent magnet on the conductive sleeve.

8. The turbomachine as claimed in claim 7, wherein the forward ring supports teeth of a labyrinth seal.

9. The turbomachine as claimed in claim 7, wherein the forward and rearward rings include through holes aligned with the axial grooves of the hub.

10. The turbomachine as claimed in claim 3, wherein the cooling fan has an inlet operatively connected to the adapter housing so as to draw the process gas from the adapter housing for maintaining a pressure difference between the alternator housing and the adapter housing, said pressure level in the alternator housing being higher than a pressure level in the adapter housing.

11. The turbomachine as claimed in claim 10, wherein the cooling fan draws the process gas from the adapter housing via a sealed heat exchanger.

12. The turbomachine as claimed in claim 10, wherein the turbine includes a turbine housing and an operating pressure in said turbine housing is higher than the pressure level in the alternator housing.

13. The turbomachine as claimed in claim 3, wherein the cooling and thrust balancing system of the turbine is configured to supply the process gas to the adapter housing via a controlled shaft seal leakage from the turbine housing.

* * * * *